United States Patent
Han et al.

(10) Patent No.: US 7,736,812 B2
(45) Date of Patent: Jun. 15, 2010

(54) ELECTROLYTE FOR RECHARGEABLE LITHIUM BATTERY AND RECHARGEABLE LITHIUM BATTERY

(75) Inventors: Won-Chull Han, Suwon-si (KR); Takaki Mori, Suwon-si (KR); Cheon-Soo Kim, Suwon-si (KR); You-Mee Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1242 days.

(21) Appl. No.: 10/884,858

(22) Filed: Jul. 1, 2004

(65) Prior Publication Data

US 2005/0019671 A1 Jan. 27, 2005

(30) Foreign Application Priority Data

Jul. 1, 2003 (KR) .................... 10-2003-0044405

(51) Int. Cl.
*H01M 10/40* (2006.01)
*H01M 4/58* (2006.01)
(52) U.S. Cl. .................. 429/328; 429/330; 429/231.95
(58) Field of Classification Search .................. None
See application file for complete search history.

(56) References Cited

U.S. PATENT DOCUMENTS 5,599,643 A * 2/1997 Plichta et al. ............... 429/220
6,376,765 B1 * 4/2002 Wariishi et al. ............. 136/263

FOREIGN PATENT DOCUMENTS

JP 2000-294272 10/2000

OTHER PUBLICATIONS

On-line translation JP 2000-294272, Oct. 20, 2000.*

Cava, M. P.; Deana, A. A.; Muth, K.; and Mitchell, M.J.; N-Phenylmaleimide; Organic Syntheses; 1973; [online], [retrieved on Apr. 25, 2008]; Retrieved from Organic Syntheses using Internet <URL: http://www.orgsyn.org/orgsyn/prep.asp?prep=cv5p0944>.*
Wypych, George, Knovel Solvents—A Properties Database, 2000, ChemTec Publishing, propylene carbonate and diethyl carbonate entries.*
Official translation of JP2000294272, published Oct. 20, 2000, translated by: Schreiber Translation, Inc. Apr. 2009.*
Maleimide entry, Knovel Critical Tables, (2nd Edition), (2003), [retrieved on Sep. 22, 2009], Retrieved from Knovel using Internet <URL: http://knovel.com/web/portal/browse/display?_EXT_KNOVEL_DISPLAY_bookid=761&VerticalID=0>.*
Patent Abstracts of Japan, Publication No. 2000-294272; Publication Date Oct. 20, 2000; in the name of Hibara et al.

* cited by examiner

*Primary Examiner*—Dah-Wei D Yuan
*Assistant Examiner*—Katherine Turner
(74) *Attorney, Agent, or Firm*—Christie, Parker & Hale, LLP

(57) ABSTRACT

Disclosed is an electrolyte for a rechargeable lithium battery including an additive for overcharge inhibition comprising a compound represented by formula 1; a lithium salt; and a non-aqueous organic solvent:

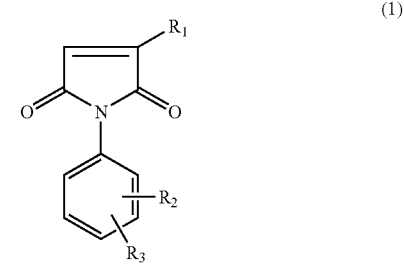

(1)

where $R_1$, $R_2$ and $R_3$ are the same or independently selected from H, $CH_3$, $C_2H_5$, $CH=CH_2$, $CH=CHCH_3$, or a functional group with N, P, or S.

8 Claims, 2 Drawing Sheets

ELECTROLYTE FOR RECHARGEABLE LITHIUM BATTERY AND RECHARGEABLE LITHIUM BATTERY

CROSS-REFERENCE TO RELATED APPLICATION

This application is based on application No. 2003-44405 filed in the Korean Intellectual Property Office on Jul. 1, 2003, the entire disclosure of which is incorporated hereinto by reference.

FIELD OF THE INVENTION

The present invention relates to an electrolyte for a rechargeable lithium battery and a rechargeable lithium battery comprising the same, and more particularly, to an electrolyte for a rechargeable lithium battery being capable of providing a battery exhibiting improved safety and prolonged cycle life characteristics, and a rechargeable lithium battery comprising the electrolyte.

BACKGROUND OF THE INVENTION

The rapid development of smaller, lighter, and higher performance communication and other electronic equipment has required the development of high performance and large capacity batteries to power such equipment. The demands for large capacity batteries have fostered investigation of rechargeable lithium batteries. The rechargeable lithium battery employs a non-aqueous electrolyte including lithium salts dissolved in organic solvents.

There have been investigations on various additives for forming a layer on a surface of a negative electrode in order to improve battery performance. One attempt is that pyrrole, thiophene, or vinylene carbonate is added to the electrolyte. These compounds polymerize during charge and discharge to form a thin polymer layer on a surface of a negative active material and improve the battery's cycle life characteristics. Another attempt is that anisole is added to the electrolyte in order to improve the battery's safety characteristics.

However, the method for forming the thin polymer layer has shortcomings in that it is difficult to control the thin layer, and there are concerns about volume expansion of the battery. The anisole forms a high-resistance polymer layer on the negative electrode after the oxidation of the positive electrode, causing deteriorating battery performance factors such as cycle life characteristics. Thus, attempts to use additives for forming layers can improve a particular battery performance factor, but at the cost of a deterioration of one or more different performance factors.

Other attempts have been made to address such shortcomings by adding ethyl maleimide or methyl maleimide, but there has not been substantial use in batteries.

SUMMARY OF THE INVENTION

It is an aspect of the present invention to provide an electrolyte for a rechargeable lithium battery which is capable of providing a battery exhibiting improved safety and cycle life characteristics.

It is another aspect to provide a rechargeable lithium battery including the electrolyte.

These and other aspects may be achieved by an electrolyte for a rechargeable lithium battery including an additive for overcharge inhibition, which additive includes a compound represented by formula 1; a lithium salt; and an organic solvent,

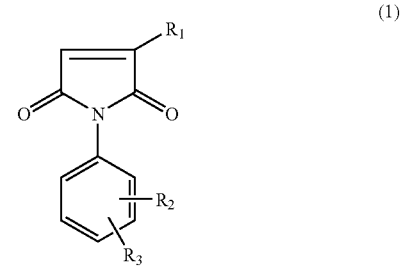

(1)

where $R_1$, $R_2$ and $R_3$ are identically or independently H, $CH_3$, $C_2H_5$, $CH=CH_2$, $CH=CHCH_3$ or a functional group with N, P or S.

The present invention further provides a rechargeable lithium battery including the electrolyte; a positive electrode; and a negative electrode. The positive electrode and the negative electrode include active materials which are capable of intercalating and deintercalating lithium.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
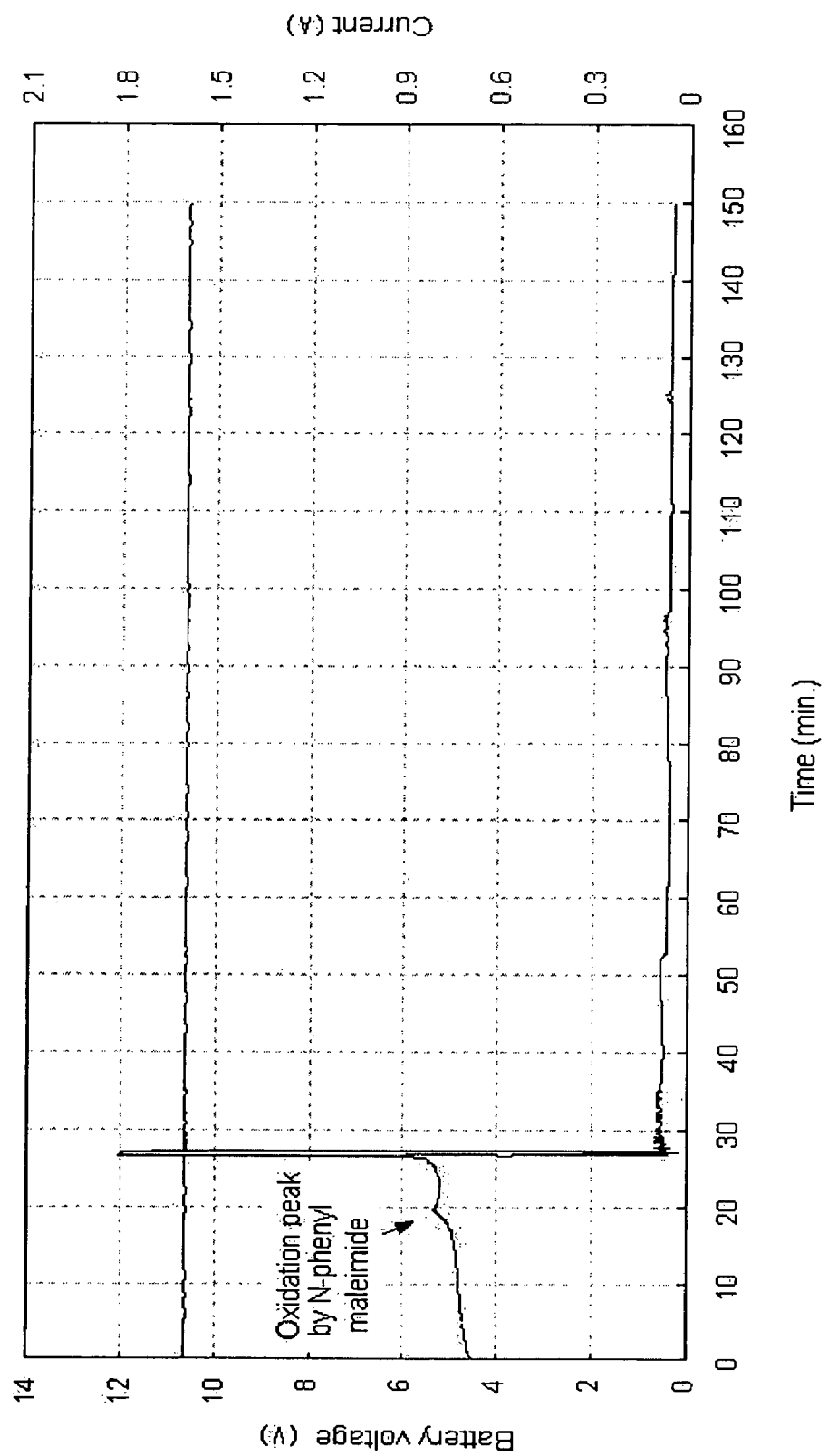
FIG. 1 is a graph showing an overcharging test result of N-phenyl maleimide used in Example 1 of the present invention.

The present invention relates to an additive for overcharge inhibition in a non-aqueous electrolyte. The additive for overcharge inhibition has a higher oxidation potential at a positive electrode than the operating voltage of the battery. Furthermore, the additive decomposes at approximately 4.8V, which is lower than the 5.5V at which a positive active material decomposes, and the decomposed product of the additive acts as a resistance factor to interrupt battery operation so that problems associated with the decomposition of the positive active material can be obviated. The decomposed product of the additive does not irreversibly form resistance factors, so it does not deteriorate the battery's cycle life characteristics. As a result, the additive for overcharge inhibition can improve safety without deterioration of the battery's cycle life characteristics.

Such an additive for overcharge inhibition includes a compound represented by formula 1. The compound is a dehydration product of a compound represented by formula 2 and a compound represented by formula 3.

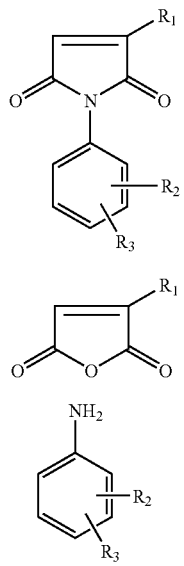

where $R_1$, $R_2$ and $R_3$ are identically or independently H, $CH_3$, $C_2H_5$, $CH=CH_2$, $CH=CHCH_3$ or a functional group with N, P, or S. The functional group with N, P or S is preferably an amino group, a phosphate group, a sulfate group, or a sulfite group.

The dehydration product is preferably N-phenyl maleimide, N-toluidyl maleimide, or N-xylidyl maleimide.

The electrolyte of the present invention includes as conventional electrolyte components a non-aqueous organic solvent and a lithium salt, in combination with the additive for overcharge inhibition.

The additive for overcharge inhibition is preferably presented in the amount of 0.1 to 20 wt %, more preferably 0.5 to 5 wt %, based on the weight of the lithium salt and the organic solvent. If the amount of the additive is less than 0.1 wt %, the effect of the addition of the additive cannot be obtained. If that of the additive is more than 20 wt %, the OCV (Open Circuit Voltage) decreases, and the battery's cycle life characteristics deteriorate.

The lithium salt acts as a source for supplying lithium ions in the battery, and facilitates the working of the battery. In addition, the lithium salt activates transfer of lithium ions between a positive electrode and a negative electrode. The lithium salt may be at least one selected from $LiPF_6$, $LiBF_4$, $LiAsF_6$, $LiCF_3SO_3$, $LiN(CF_3SO_2)_3$, $Li(CF_3SO_2)_2N$, $LiC_4F_9SO_3$, $LiClO_4$, $CF_3SO_3Li$, $LiN(SO_2C_2F_5)_2$, $LiSbF_6$, $LiAlO_4$, $LiAlCl_4$, $LiN(C_xF_{2x+1}SO_2)(C_xF_{2y+1}SO_2)$ (where x and y are natural numbers), LiCl, or LiI. The concentration of the lithium salt is suitably 0.6 to 2.0M in the electrolyte. If the concentration of the lithium salt is less than 0.6M, the conductivity of the electrolyte decreases, deteriorating the performance of the electrolyte. If that of the lithium salt is more than 2.0M, the viscosity of the electrolyte increases, reducing the mobility of lithium ions.

The non-aqueous organic solvent acts as a medium that can transport ions that participate in the electrochemical reactions. The organic solvent includes at least one cyclic carbonate, linear carbonate, ester, or ketone. If a mixture thereof is used, the mixing ratio can be suitably controlled according to the desired battery performances as is well understood in the related art. The cyclic carbonates may be at least one selected from ethylene carbonate, propylene carbonate, or a mixture thereof. The linear carbonate may be at least one selected from dimethyl carbonate, diethyl carbonate, ethylmethyl carbonate, or methyl carbonate. The ester may be at least one of γ-butyrolactone, valerolactone, decanolide, or mevalolactone. The ketone may be polymethylvinyl ketone.

A rechargeable lithium battery with the inventive polymer electrolyte includes a positive electrode and a negative electrode.

The positive electrode includes a positive active material in which lithium intercalation reversibly occurs. Examples of the positive active material are lithium transition metal oxides such as $LiCoO_2$, $LiNiO_2$, $LiMnO_2$, $LiMn_2O_4$, or $LiNi_{1-x-y}Co_xM_yO_2$ (where $0 \leq x \leq 1$, $0 \leq y \leq 1$, $0 \leq x+y \leq 1$; and M is a metal or rare earth such as Al, Sr, Mg, or La).

The negative electrode includes a negative active material in which lithium intercalation reversibly occurs. Examples of the negative active material are crystalline or amorphous carbonaceous materials, or carbon composites.

The positive active material and the negative active material are respectively coated on current collectors to produce electrodes, and the electrodes are wound together with or laminated on a separator to produce an electrode element. The electrode element is inserted into a battery case such as a can, and an electrolyte is injected into the case to fabricate a rechargeable lithium battery. The separator may be a resin such as polyethylene or polypropylene.

Figure 2:
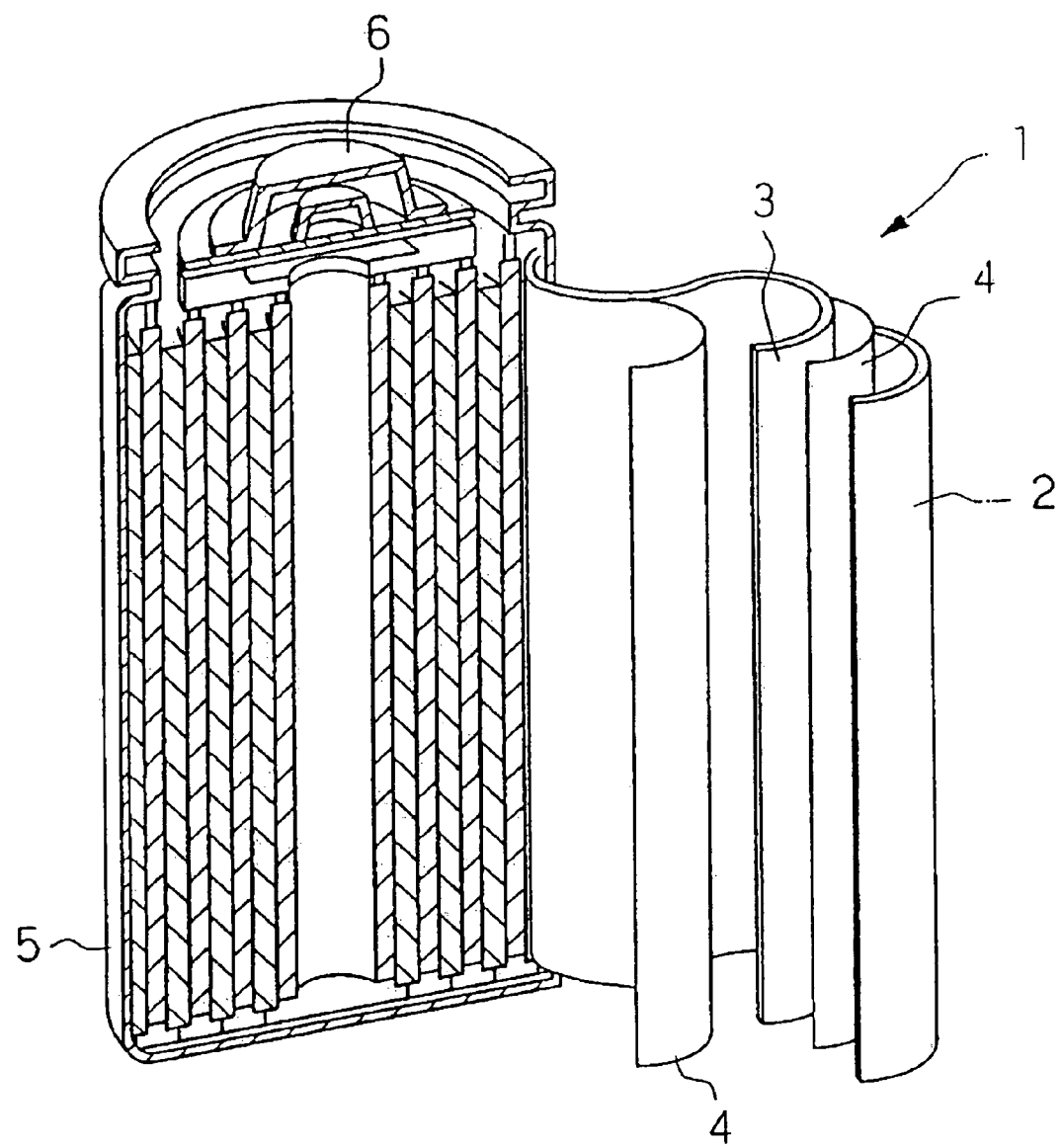
FIG. 2 is a schematic view showing an embodiment of a structure of the lithium secondary battery of the present invention.

An embodiment of the rechargeable lithium battery of the present invention is shown in FIG. 2. The rechargeable lithium battery 1 includes a positive electrode 3; a negative electrode 2; a separator 4 interposed between the positive electrode 3 and the negative electrode 2; an electrolyte in which the positive electrode 2, the negative electrode 3, and the separator 4 are immersed; a cylindrical battery case 5; and a sealing portion 6. The configuration of the rechargeable lithium battery is not limited to the structure shown in FIG. 2, as it can be readily modified into a prismatic- or pouch-type battery as is well understood in the related art.

The following examples further illustrate the present invention in detail, but are not to be construed to limit the scope thereof.

COMPARATIVE EXAMPLE 1

A $LiCoO_2$ positive active material, a graphite conductive agent, and a polyvinylidene fluoride binder were mixed in an N-methyl-2-pyrrolidone solvent at a weight ratio of 91:6:3 to prepare a positive active material slurry. The positive active material slurry was coated on an aluminum foil current collector and dried, followed by compression-molding with a roller presser, thereby producing a positive electrode.

A graphite negative active material and a polyvinylidene fluoride binder were mixed in an N-methyl-2-pyrrolidone solvent at a weight ratio of 90:10 to prepare a negative active material slurry. The negative active material slurry was coated on a copper foil current collector and dried, followed by compression-molding with a roller presser, thereby producing a negative electrode.

A 1M $LiPF_6$ lithium salt solution was prepared by dissolving $LiPF_6$ in a mixed solvent of ethylene carbonate and propylene carbonate (2:8 volume ratio) to prepare an electrolyte.

Using the positive electrode, the negative electrode, and the electrolyte, a rechargeable lithium cell was fabricated by the conventional procedure.

EXAMPLE 1

A rechargeable lithium cell was fabricated by the same procedure as in Comparative Example 1, except that N-phenyl maleimide was added to a mixture of 1M LiPF$_6$ lithium salt in ethylene carbonate and propylene carbonate (2:8 volume ratio) to prepare an electrolyte. The amount of N-phenyl maleimide was 3 wt % of the electrolyte.

EXAMPLE 2

A rechargeable lithium cell was fabricated by the same procedure as in Comparative Example 1, except that N-phenyl maleimide was added to a mixture of 1M LiPF$_6$ lithium salt in ethylene carbonate and propylene carbonate (2:8 volume ratio) to prepare an electrolyte. The amount of N-phenyl maleimide was 0.1 wt % of the electrolyte.

EXAMPLE 3

A rechargeable lithium cell was fabricated by the same procedure as in Comparative Example 1, except that N-phenyl maleimide was added to a mixture of 1M LiPF$_6$ lithium salt in ethylene carbonate and propylene carbonate (2:8 volume ratio) to prepare an electrolyte. The amount of N-phenyl maleimide was 20 wt % of the electrolyte.

EXAMPLE 4

A rechargeable lithium cell was fabricated by the same procedure as in Comparative Example 1, except that N-toluidyl maleimide was added to a mixture of 1M LiPF$_6$ lithium salt in ethylene carbonate and propylene carbonate (2:8 volume ratio) to prepare an electrolyte. The amount of N-toluidyl maleimide was 3 wt % of the electrolyte.

EXAMPLE 5

A rechargeable lithium cell was fabricated by the same procedure as in Comparative Example 1, except that N-xylidyl maleimide was added to a mixture of 1M LiPF$_6$ lithium salt in ethylene carbonate and propylene carbonate (2:8 volume ratio) to prepare an electrolyte. The amount of N-xylidyl maleimide was 20 wt % of the electrolyte.

COMPARATIVE EXAMPLE 2

A rechargeable lithium cell was fabricated by the same procedure as in Comparative Example 1, except that N-cyclohexyl maleimide was added to a mixture of 1M LiPF$_6$ lithium salt in ethylene carbonate and propylene carbonate (2:8 volume ratio) to prepare an electrolyte. The amount of N-cyclohexyl maleimide was 3 wt % of the electrolyte.

COMPARATIVE EXAMPLE 3

A rechargeable lithium cell was fabricated by the same procedure as in Comparative Example 1, except that N-methyl maleimide was added to a mixture of 1M LiPF$_6$ lithium salt in ethylene carbonate and propylene carbonate (2:8 volume ratio) to prepare an electrolyte. The amount of N-methyl maleimide was 3 wt % of the electrolyte.

The standard capacity, the capacity retention after 400 cycles, and overcharging at 2C were tested for the rechargeable lithium cells according to Comparative Examples 1 to 3 and Example 1. The standard capacity was measured by charging at 0.5C by 4.2V and a cut-off current of 0.02C, and discharging at 0.5C and a cut-off voltage of 3.0V.

The capacity retention was measured by charging at 0.5C by 4.2V and a cut-off current of 0.02C, and discharging at 1C and a cut-off voltage of 2.75V. The results are presented in Table 1.

TABLE 1

| | Standard capacity | Capacity retention after 400 cycles | Overcharging at 2C |
|---|---|---|---|
| Comparative Example 1 | 320 Wh/l | 80% | Combustion |
| Example 1 | 325 Wh/l | 83% | OK |
| Example 2 | 319 Wh/l | 84% | OK |
| Example 3 | 326 Wh/l | 80% | OK |
| Example 4 | 320 Wh/l | 83% | OK |
| Example 5 | 323 Wh/l | 82% | OK |
| Comparative Example 2 | 323 Wh/l | 82% | Combustion |
| Comparative Example 3 | 320 Wh/l | 78% | Combustion |

As shown in Table 1, the cells according to Examples 1 to 5 exhibited better safety characteristics at 2C and higher capacity retention when compared to Comparative Example 1. The results indicated that maleimides provide rechargeable lithium batteries exhibiting good safety and improved cycle life characteristics.

Furthermore, the effect of the additives N-phenyl maleimide, N-toluidyl maleimide, and N-xylidyl maleimide used in Examples 1 to 5 cannot be obtained from N-cyclohexyl maleimide used in Comparative Example 2 and N-methyl maleimide used in Comparative Example 3, even though the three compounds have similar maleimide structures. These results are considered to occur because an oxidation peak (which means an electric loss by oxidizing and decomposing of the positive electrode) by N-phenyl maleimide, N-toluidyl maleimide, or N-xylidyl maleimide occurs at approximately 4.8V, which is very much higher than the 4.3V of the upper limit voltage of the general battery, and is lower than the 5.5V at which safety problems occur. Therefore, even though a very high voltage is applied to the battery, the N-phenyl maleimide additive makes the battery stop functioning before the decomposition of the positive electrode. As a result, the safety characteristics are improved. Furthermore, the additive is stable until the voltage reaches 4.8V, which is higher than the upper voltage, so that the additive does not cause deterioration of the battery's cycle life characteristics, which otherwise occurs when conventional additives for overcharge inhibition are utilized.

The present invention accordingly provides additives for overcharge inhibition that can improve safety characteristics of rechargeable lithium batteries without deterioration of the battery's cycle life characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a rechargeable lithium battery, comprising:
    an additive comprising a compound selected from the group consisting of N-phenyl maleimide and N-toluidyl maleimide;
    a lithium salt; and
    a non-aqueous organic solvent, wherein the additive is present in the electrolyte in an amount ranging from 0.1 to 20 wt % based on the weight of the electrolyte.

2. The electrolyte of claim 1, wherein the amount of the additive is 0.5 to 5 wt % based on the weight of the electrolyte.

3. The electrolyte of claim 1, wherein the non-aqueous organic solvent is at least one selected from the group consisting of cyclic carbonates, linear carbonates, esters, ethers, and ketones.

4. The electrolyte of claim 1, wherein the lithium salt is selected from the group consisting of $LiPF_6$, $LiBF_4$, $LiAsF_6$, $LiCF_3SO_3$, $LiN(CF_3SO_2)_3$, $Li(CF_3SO_2)_2N$, $LiC_4F_9SO_3$, $LiClO_4$, $CF_3SO_3Li$, $LiN(SO_2C_2F_5)_2$, $LiSbF_6$, $LiAlO_4$, $LiAlCl_4$, $LiN(C_xF_{2x+1}SO_2)(C_xF_{2y+1}SO_2)$ (where x and y are natural numbers), LiCl, and LiI.

5. A rechargeable lithium battery comprising:
    an electrolyte comprising an additive comprising a compound selected from the group consisting of N-phenyl maleimide and N-toluidyl maleimide; a lithium salt and a non-aqueous organic solvent, wherein the additive is present in the electrolyte in an amount ranging from 0.1 to 20 wt % based on the weight of the electrolyte;
    a positive electrode comprising a positive active material which is capable of intercalating and deintercalating lithium; and
    a negative electrode comprising a negative active material which is capable of intercalating and deintercalating lithium.

6. The rechargeable lithium battery of claim 5, wherein the amount of the additive is 0.5 to 5 wt % based on the weight of the electrolyte.

7. The rechargeable lithium battery of claim 5, wherein the non-aqueous organic solvent is at least one selected from the group consisting of cyclic carbonates, linear carbonates, esters, ethers, and ketones.

8. The rechargeable lithium battery of claim 5, wherein the lithium salt is selected from the group consisting of $LiPF_6$, $LiBF_4$, $LiAsF_6$, $LiCF_3SO_3$, $LiN(CF_3SO_2)_3$, $Li(CF_3SO_2)_2N$, $LiC_4F_9SO_3$, $LiClO_4$, $CF_3SO_3Li$, $LiN(SO_2C_2F_5)_2$, $LiSbF_6$, $LiAlO_4$, $LiAlCl_4$, $LiN(C_xF_{2x+1}SO_2)(C_xF_{2y+1}SO_2)$ (where x and y are natural numbers), LiCl, and LiI.

* * * * *